United States Patent [19]
Bockmann et al.

[11] 3,816,287
[45] June 11, 1974

[54] PHOTOLYTIC PROCESS FOR THE CONTINUOUS PRODUCTION OF BENZOTRICHLORIDE WITH A LOW BENZAL CHLORIDE CONTENT

[75] Inventors: Walter Bockmann; Rudolf Hornung, both of Krefeld-Bockum, Germany

[73] Assignee: Bayer Aktiengesellschaft, Leverkusen, Germany

[22] Filed: Oct. 2, 1972

[21] Appl. No.: 294,129

[30] Foreign Application Priority Data
June 6, 1972 Germany.............................. 2227337
Oct. 22, 1971 Germany.............................. 2152608

[52] U.S. Cl............................................. 204/163 R
[51] Int. Cl................................................ B01j 1/10
[58] Field of Search 204/163 R; 260/651 R, 651 HA

[56] References Cited
UNITED STATES PATENTS
1,828,858  10/1931  Conklin.......................... 204/163 R
2,695,873  11/1954  Loverde......................... 204/163 R
2,810,688  10/1957  Ivins et al...................... 204/163 R
2,811,486  10/1957  Reynold et al.................. 204/163 R

*Primary Examiner*—Benjamin R. Padgett
*Attorney, Agent, or Firm*—Burgess, Dinklage & Sprung

[57] ABSTRACT

Benzotrichloride is prepared in a continuous process in two steps. In the first step toluene is reacted with chlorine in the presence of light, at a temperature in the range of 70° to 190°C and in at least two vessels or reactors. In the second step benzal chloride and residual benzyl chloride produced in the first step are converted to benzotrichloride by reaction with an excess of chlorine at a temperature of from 70° to 190°C. The chlorine in the second step is diluted with an inert gas and like the first step the second step is carried out in at least two vessels and the residence time for the reaction for the first and second steps in the ratio of 1.3 to 1.5. The ratio of chlorine to inert gas is regulated from vessel to vessel in the second step of the reaction.

7 Claims, 1 Drawing Figure

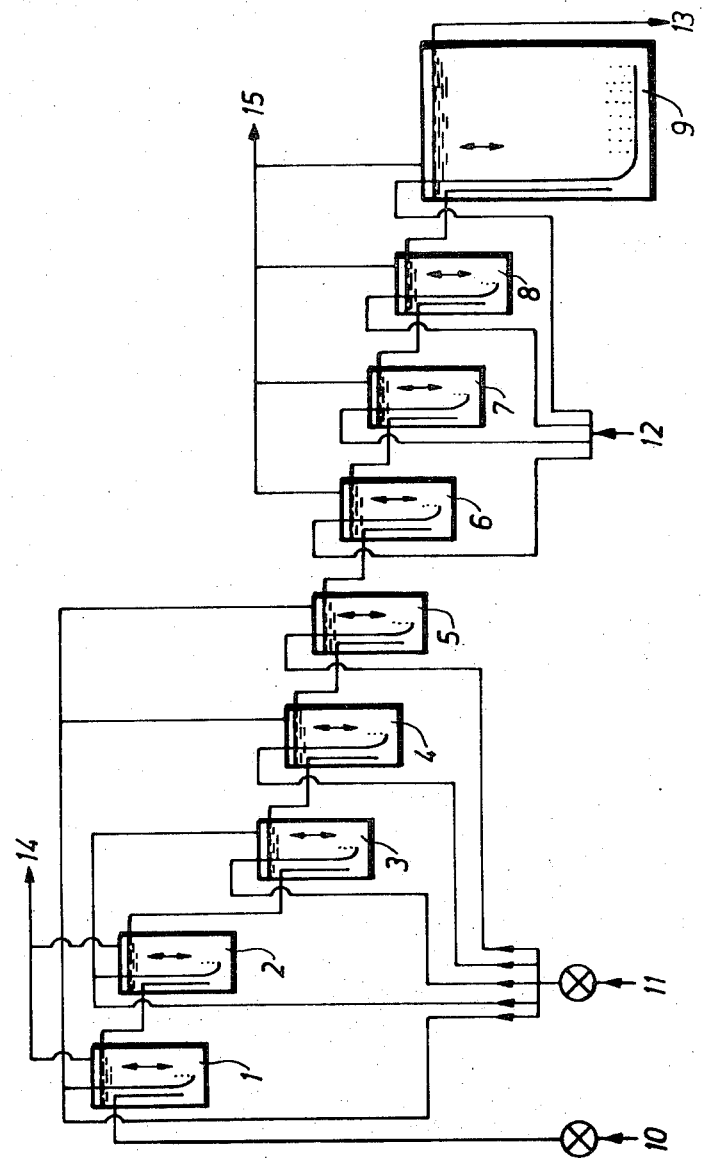

PHOTOLYTIC PROCESS FOR THE CONTINUOUS PRODUCTION OF BENZOTRICHLORIDE WITH A LOW BENZAL CHLORIDE CONTENT

BACKGROUND

This invention relates to a particularly advantageous process for the continuous production of benzotrichloride with a low benzal chloride content by which comprises chlorinating toluene. The formation of benzotrichloride by the chlorination of toluene proceeds stepwise via benzyl chloride and benzal chloride. On a large technical scale the production of benzotrichloride from toluene is carried out batchwise, leaving aside the process described in DDR Pat. No. 15 100. However, when the continuous process of production is employed, the formation of by-products is difficult to prevent. In the process according to DDR Pat. No. 15 100, the starting materials, toluene and chlorine, are reacted together by introducing them into benzotrichloride which has been heated to a temperature of at least 200° to 205°C, and benzotrichloride is continuously removed from the reaction chamber at the rate of its formation. Benzotrichloride obtained by this process, however, contains about 0.4 percent of benzal chloride and is, therefore, unsuitable for many purposes. Furthermore, by repeating this known process it has been found that benzotrichloride produced on a large technical scale by this process varies in its quality owing to the variation in its benzyl chloride content and its content of by-products which are chlorinated on the nucleus. This is demonstrated by the fact that when chlorine is introduced into pure, distilled benzotrichloride under the conditions of the DDR Patent, substantial quantities of higher boiling and in part no longer distillable products which are chlorinated at the nucleus are immediately formed, the formation of these products proceeding particularly rapidly at the prescribed temperature range for the reaction from 200° to 205°C. The quantity of by-products which are chlorinated in the nucleus is 16.5 percent after 3 hours continuous introduction of chlorine and rises to 22.4 percent after 5 hours.

This quantity of by-products which are chlorinated in the nucleus is formed even if the chlorine is not introduced into pure benzotrichloride but into a mixture which contains a substantial quantity of benzyl chloride and which is equal in its composition to the mixture which is inevitably formed before the benzotrichloride stage is reached:

| | |
|---|---|
| Toluene: | 0.1 % |
| Benzyl chloride: | 9 % |
| Benzal chloride: | 55 % |
| Benzotrichloride: | 34 % |
| By-products chlorinated in the nucleus: | 2 % |

When chlorine is introduced into this mixture under the conditions indicated in DDR Pat. No. 15 100, the proportion of by-products which are chlorinated in the nucleus is 13.5 percent after only 2 hours and 17.6 percent after 3 hours.

It is found that although the rate of increase in the formation of products which are chlorinated in the nucleus slows down in the terminal phase of the preparation of benzotrichloride due to the reduction in the amount of excess chlorine (based on the stoichiometrically required quantity), the rate of reaction with the benzal chloride still present in the reaction mixture slows down considerably. The consequence of this is that although the resulting benzotrichloride contains smaller quantities of products which are chlorinated in the nucleus, the proportion of benzal chloride is too high.

SUMMARY

It has now surprisingly been found that benzotrichloride having only a low benzal chloride content can easily be obtained in excellent yields by a simple continuous process comprising the chlorination of toluene at elevated temperatures in the presence of light. In this process, toluene is first reacted with from 75 to 96 percent of the stoichiometric quantity of chlorine required for the formation of benzotrichloride. This reaction is carried out under the influence of light at temperatures of from 70° to 190°C in a first section comprising at least two vessels. The benzal chloride and residual quantities of benzyl chloride present in the reaction mixture are then converted into benzotrichloride by reacting them with an excess of chlorine diluted with inert gas, the amount of chlorine used being up to 30 percent in excess of the total stoichiometric quantity required for the reaction of toluene. This reaction is also carried out at a temperature in the range of from 70° to 190°C in a second section which also comprises at least two vessels. In this second section, the proportion by volume of chlorine to inert gas is reduced from between 10 : 1 to 2 : 1 employed in the first vessel to between 1 : 3 to 1 : 10 used in the subsequent vessel or vessels, and the residence times of the reaction mixture in the first and second sections are related to each other in ratios of from 1 : 3 to 1 : 5.

DESCRIPTION

The reaction temperature is preferably 80° to 160°C in the first chlorination section and 110° to 170°C in the second section. The quantity of chlorine used in the first chlorination section is preferable 85 to 96 percent of the stoichiometrically required quantity. The excess chlorine diluted with inert gas used in the second section is preferably 10 to 25 percent. The ratio of chlorine to inert gas in the second section ranges from about 5 : 1 to 2 : 1, down to 1 : 5. The ratio of the residence time in section 1 to the residence time in section 2 is preferably about 1 : 4. The number of vessels in the first chlorination section is from two to seven, preferably five or six. The number of vessels in the second chlorination section is from two to five, preferably three or four. According to a particularly advantageous embodiment of the process of the invention, the volume of the vessels used in the last chlorination stage of the second section is two to three times the volume of all the preceding vessels of sections 1 and 2.

According to the process of the invention, the chlorine excess required to reduce the benzal chloride content in the end product as much as possible is restricted to as few stages of the reaction as possible. In order to suppress unwanted effects of the chlorine excess (increased formation of by-products which are chlorinated in the nucleus), the invention also provides that the required chlorine excess is diluted with gases which are inert in the reaction (for example nitrogen or hydrogen chloride), preferably nitrogen. The process of the invention may be carried out, for example in a nine stage chlorination apparatus (=with nine vessels) arranged in cascade formation in two sections as already mentioned above, chlorine being introduced into the first section (stages 1 to 5) in amounts of 2.3 to 2.9 mol, preferably 2.6 to 2.9 mol, per mol of toluene, which corresponds to about 86 to 96 percent of the stoichiometric quantity of chlorine required for the production of benzotrichloride from toluene, while in the second section (Stages 6 to 9), the resulting reaction mixture is chlorinated up to practically complete formation of benzotrichloride with an excess of chlorine which must be diluted with inert gas.

If the process of the invention is carried out using five vessels in the first section, the waste gases from the third to fifth vessel which contain increasing proportions of unreacted chlorine as the degree of chlorination of the reaction mixture increases, may be returned to the first and/or second vessel so that the waste gases of the first section of chlorination have a chlorine content of less than one volume percent. Since the amount of chlorine used in the first section of the process according to the invention is less than the amount of chlorine required for the chlorination of toluene to benzotrichloride, the waste gases from vessels 3, 4 and 5 of the first section of the process may always be returned to the first two vessels of the first section without any risk of chlorination of toluene in the nucleus or of the formation of any other by-products. This procedure therefore contains a considerable technical advance.

In the second section of the chlorination process, which may consist, for example, of vessels 6 to 9, it is necessary to use an excess of chlorine, based on the quantity of chlorine required for the chlorination of toluene to benzotrichloride, in order to ensure complete chlorination of the reaction mixture from the first section of the process into benzotrichloride. Provided the procedures mentioned above are observed, this excess can safely be used without entailing any disadvantages or resulting in the formation of unwanted by-products.

The number of chlorination vessels employed in the process of the invention and the subdivision of the vessels into two sections may, of course, be varied even more widely. The chlorine-containing waste gases from the second section of the process of the invention are advantageously conveyed directly to a separate production plant where they may be used, for example, for the production of benzyl chloride. Benzotrichloride obtained as the product of the process according to the invention contains at the most 0.2 percent by weight of benzal chloride and the proportion of products which are chlorinated in the nucleus is not more than about 5.2 percent by weight. Benzotrichloride obtained by the process according to the invention therefore has a purity of more than 94 percent by weight. The process, therefore, provides for a rational continuous production of benzotrichloride of consistent quality at a high production rate. It must be regarded as distinctly surprising that it is possible with a continuous method of operation to lower the benzal chloride content to below 0.2 percent and at the same time prevent the proportion of unwanted by-products, which are mainly products chlorinated in the nucleus, from rising above 5.2 percent by weight. Thus, not only is the benzotrichloride product consistent in quality regardless of the output rate of the plant but, furthermore, the yield based on the quantity of chlorine put into the process is improved compared with the prior art (see following example with arrangement of apparatus).

The benzotrichloride obtained has many possible applications, for example as an intermediate product for the production of benzoyl chloride or for the production of coal tar dyes (see Ullmann's Enzyklopaedie der technischen Chemie, 3rd Edition (1954), Volume 5, page 460 and A. Römpp, Chemielexikon 6th Edition (1966), pages 645 and 646).

Example

Benzotrichloride is produced continuously in a plant consisting of nine enamel vessels arranged in cascade formation behind one another, the first eight of which have a capacity of 400 litres each and the ninth a capacity of about 6 m$^3$ (see FIG. 1). The procedure is as follows:

Each of the nine reaction vessels is equipped with a high pressure mercury immersion lamp (2,000 Watt). Toluene is introduced into the first vessel at a uniform rate of 210 l/h and flows by gravity into the second, third and subsequent vessel down to the ninth and is chlorinated at the same time.

The addition of chlorine is subdivided into two sections: The first section covers vessels 1 to 5, into which chlorine is introduced at the rate of 129 m$^3$ per hour. Based on the quantity of toluene used, this corresponds to 2.9 times the molar quantity of 96.0 percent of the theoretical quantity required for formation of benzotrichloride. This rate of feed of chlorine, which is kept constant, is subdivided as follows among vessels 1 to 5 vessel 1: 28 m$^3$/h of chlorine; vessel 2: 19 m$^3$/h of chlorine; vessel 3: 38 m$^3$/h of chlorine; vessel 4: 29 m$^3$/h of chlorine; vessel 5: 15 m$^3$/h of chlorine.

Already at the fifth vessel the chlorine introduced is diluted with nitrogen (ratio by volume of $Cl_2 : N_2 = 3 : 1$.

Since the waste gas contains an increasing proportion of unreacted chlorine as the degree of chlorination increases, the waste gases from vessels 3 to 5 are returned, that from vessel 3 being returned to vessel 2 and that from vessels 4 and 5 to vessel 1. The chlorine introduced is in this way made to undergo almost quantitative reaction, and the combined waste gas from vessels 1 and 2 contains less than 1 percent of chlorine.

The average residence time of the product flowing through the apparatus is about 6.6 hours in the first chlorination section (see Table 1).

The heat of reaction produced in the chlorination reaction is removed from the reaction vessels by a continuous stream of cooling water (jacket cooling) adjusted to the rate of flow of product.

The reaction mixture from the first section of chlorination still contains 2.0 percent of benzyl chloride and 38.6 percent of benzal chloride in addition to 57.1 percent of benzotrichloride (see Table 2).

This mixture is continuously chlorinated in the second section of chlorination (vessels 6, 7, 8 and 9) until the benzal chloride content is only $\leq$ 0.2.

This requires 37 m$^3$ of chlorine per hour, which corresponds to an excess of 23.2 percent.

This quantity of chlorine is subdivided among vessels 6 to 9 as indicated below and in addition diluted with increasing proportions of nitrogen:

Vessel 6: 16 m$^3$ of chlorine and 8 m$^3$ of nitrogen per hour;

Vessel 7: 10 m³ of chlorine and 8 m³ of nitrogen per hour;

Vessel 8: 6 m³ of chlorine and 15 m³ of nitrogen per hour;

Vessel 9: 5 m³ of chlorine and 25 m³ of nitrogen per hour.

Cooling with water may be dispensed with in vessels 6 to 8. Vessel 9 is maintained at a constant temperature (about 150°C) by heating with steam at a pressure of five excess atmospheres (temperature variation see Table 1).

The waste gas from vessels 6 to 9 contains a high proportion of unreacted chlorine (about 10 to 50 percent). The waste gases are utilized in adjacent production plants for the production of other products of chlorination.

The average residence time in the second section of chlorination is 23.9 hours, of which 21.2 hours are spent in the ninth alone (the last) (see Table 1).

The end product discharged from the ninth vessel contains 0.2 percent of benzal chloride and 94.4 percent of benzotrichloride. Its content in by-products which are chlorinated in the nucleus and constituents which cannot be distilled is 5.2 percent. Further details may be found in Tables 1 and 2 below.

TABLE 1.—TABULATED SUMMARY RELATING TO THE EXAMPLE

Rate of throughput: (a) Raw material: 210 l./h. of toluene (~185 kg./h.) 166 m.³/h. chlorine (~526 kg./h.); corresponding to ~23% excess. (b) End product: 283 l./h. of benzotrichloride (~392 kg./h.).

Reaction conditions:

| Reaction vessel | Addition of toluene, l./h. | Introduction of chlorine | | | Nitrogen inflow, m.³/h. | Ratio by volume of Cl₂:N₂ | Time of stay in hours | Reaction temperature, °C |
| | | m.³/h. | Based on the stoichiometric quantity required in— | | | | | |
| | | | Mol | Percent | | | | |
| --- | --- | --- | --- | --- | --- | --- | --- | --- |
| 1 | 210 | 28 | 0.6 | 20.8 | | | 1.6 | 89 |
| 2 | | 19 | 0.5 | 14.1 | | | 1.4 | 96 |
| 3 | | 38 | 0.8 | 28.2 | | | 1.3 | 126 |
| 4 | | 29 | 0.6 | 21.5 | | | 1.2 | 130 |
| 5 | | 15 | 0.4 | 11.4 | 5 | 3:1 | 1.1 | 156 |
| Total first section | 210 | 129 | 2.9 | 96.0 | 5 | | 6.6 | |
| 6 | | 16 | 0.4 | 11.7 | 8 | 2:1 | 1.0 | 173 |
| 7 | | 10 | 0.2 | 7.4 | 8 | 1.25:1 | 0.9 | 140 |
| 8 | | 6 | 0.1 | 4.4 | 15 | 1:2.5 | 0.8 | 119 |
| 9 | | 5 | 0.1 | 3.7 | 25 | 1:5 | 21.2 | 151 |
| Total second section | | 37 | 0.8 | 27.2 | 56 | | 23.9 | |
| Sum of first plus second section | 210 | 166 | 3.7 | 123.2 | 61 | | 30.5 | |

TABLE 2.—TABULATED SUMMARY RELATING TO THE EXAMPLE

Composition of the reaction product:

| | | Percent by weight | | | | |
| Reaction vessel | Density at 20°C. | Toluene | Benzyl chloride | Benzal chloride | Benzotrichloride | Sum of by-products chlorinated in the nucleus plus undistillable residue |
| --- | --- | --- | --- | --- | --- | --- |
| 1 | 1.018 | 56.4 | 35.1 | 5.9 | 0.4 | 1.5 |
| 2 | 1.110 | 28.4 | 49.1 | 19.8 | 0.9 | 1.5 |
| 3 | 1.227 | 1.4 | 36.3 | 49.5 | 11.0 | 1.6 |
| 4 | 1.295 | 0.1 | 10.5 | 50.5 | 36.1 | 2.0 |
| 5 | 1.353 | | 2.0 | 38.6 | 57.1 | 2.3 |
| 6 | 1.361 | | 0.2 | 17.2 | 79.6 | 2.9 |
| 7 | 1.373 | | 0.01 | 7.2 | 89.3 | 3.3 |
| 8 | 1.379 | | 0.01 | 1.8 | 94.1 | 3.9 |
| 9 | 1.386 | | 0.0 | 0.2 | 94.4 | 5.2 |

The reference numerals in the drawing showing the arrangement of apparatus (FIG. 1) have the following meanings:

1 to 9: Reaction vessels
10: Toluene inlet
11, 12: Chlorine inlets
13: Benzotrichloride discharge
14: HCl waste gas (Cl₂ content ≦ 1 percent)
15: HCl waste gas (Cl₂ content 10 to 50 percent)
↯: Hg immersion lamp
⊗: Inflow valves to keep rate of supply constant

What is claimed is:

1. Process for the continuous production of benzotrichloride which comprises:
   a. in a first step, reacting toluene with from 75 percent to 96 percent of the stoichiometric quantity of chlorine required for the formation of benzotrichloride, in the presence of light, at a temperature in the range of from 70° to 190°C and in at least two vessels; and
   b. in a second step, converting the benzal chloride and residual quantities of benzyl chloride produced from the first step to benzotrichloride by reaction at a temperature of from 70° to 190°C with an excess of chlorine of up to 30 percent based on the total quantity of chlorine stoichiometrically required for the reaction with toluene, the chlorine being diluted with an inert gas; carrying out the second step in at least two vessels in which the ratio of chlorine to inert gas is reduced from within the range of from 10:1 to 2:1 in the first vessel to within the range of from 1:3 to 1:10 in subsequent vessels; the residence times of the reaction mixture in the first and second steps being in the ratio of from 1:3 to 1:5.

2. Process of claim 1 wherein the second step is carried out in the presence of light.

3. Process of claim 1 wherein the reaction temperature is in the range of from 80° to 160°C in the first step and from 110° to 170°C in the second step.

4. A process of claim 1 wherein the ratio of the residence time in the first step to the residence time in the second step is 1:4.

5. Process of claim 1 wherein the first step uses five to six vessels and the second step uses three to four vessels.

6. A process of claim 1 wherein each stage of both steps of the reaction is carried out in a separate reaction vessel.

7. Process of claim 6 wherein the volume of the vessel of the last stage of the second step is from 2 to 3 times the volume of all the preceding vessels in the first and second steps.

* * * * *